United States Patent

[11] 3,540,761

| [72] | Inventor | Joel Bruce Barlow |
| | | 44 Applewood Lane, Glastonbury, Connecticut 06033 |
| [21] | Appl. No. | 833,941 |
| [22] | Filed | June 17, 1969 |
| [45] | Patented | Nov. 17, 1970 |

[54] COUPLING ASSEMBLY
3 Claims, 4 Drawing Figs.

[52] U.S. Cl............................................. 285/342,
285/354, 285/355, 285/423
[51] Int. Cl............................................. F16l 17/02
[50] Field of Search................................. 285/346,
354, 342, 343, 386, 389, 423, 355, 390; 4/191

[56] References Cited
UNITED STATES PATENTS
| 455,502 | 7/1891 | Bayles........................ | 285/424 |
| 1,777,977 | 11/1930 | Lente........................... | 285/355X |
| 1,853,411 | 4/1932 | Gentry et al................. | 285/342 |
| 2,461,354 | 2/1949 | Stone........................... | 4/191 |
| 2,552,768 | 5/1951 | Brophy........................ | 285/386X |
| 2,743,461 | 5/1956 | Urbas........................... | 4/191 |

FOREIGN PATENTS
| 615,054 | 6/1935 | Germany..................... | 285/390 |

Primary Examiner—Dave W. Arola
Attorney—Peter L. Costas

ABSTRACT: A coupling assembly includes a first member which has a generally helical flange adjacent one end, and an internally threaded member engaged therewith having a complementary helical groove seating the flange. The flange and groove are of substantially rectangular cross section and are cooperatively dimensioned for close fitting threaded interengagement.

Patented Nov. 17, 1970  3,540,761
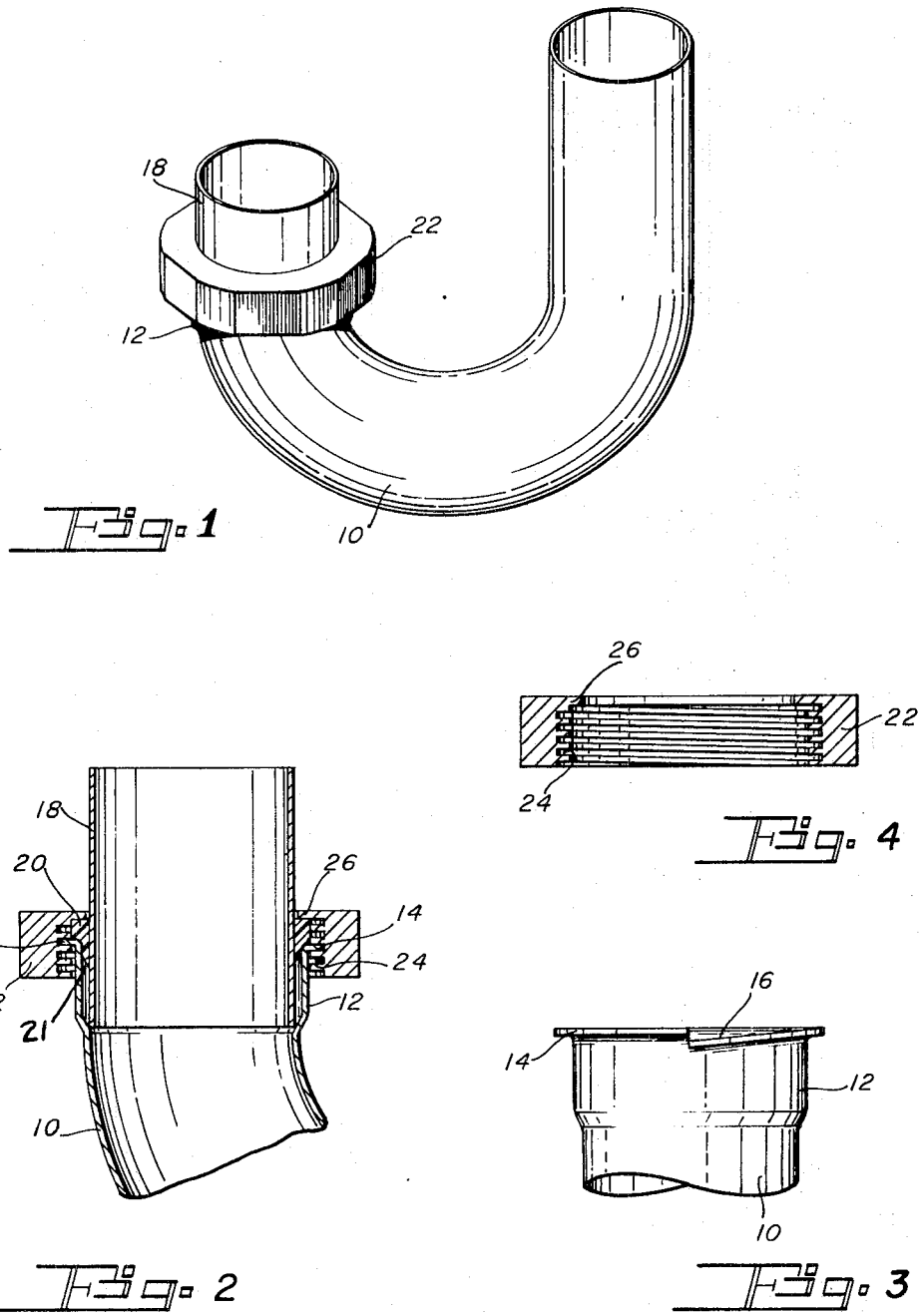
JOEL BRUCE BARLOW, INVENTOR
BY Peter L. Costas
Attorney

COUPLING ASSEMBLY

BACKGROUND OF THE INVENTION

The conventional manner of joining pipes, tubes and the like by providing complementary threaded surfaces is somewhat disadvantageous and tends to be relatively expensive because separate operations are usually required to produce the threaded portions on the two conduits, and because the wall thicknesses of the coupled conduits must generally be sufficient to permit threads to be cut or otherwise formed therein. More permanent joints may be produced by sweating, brazing, welding, etc., without the need for threads, but sometimes such joints are undesirable or inconvenient and their production may involve equipment which is expensive or not readily available; also, such joints are more difficult to disassemble for needed repairs.

More recently, it has been found that tubular conduits and the like can be coupled together by providing one of them with a radially extending helical flange, upon which a nut may be threaded. It is economical and convenient to produce such a flange by swaging a relatively thin gauge tube, but the joint resulting from coupling a conventional nut having V-shaped threads therewith has been found to be of a relatively low order of strength.

Accordingly, it is the aim of the present invention to provide a novel coupling assembly employing components which are relatively simple and economical to produce but which nevertheless provide a secure and fluid-tight joint, and which may be disassembled readily to effect repairs.

SUMMARY OF THE INVENTION

It has now been found that the foregoing and related aims can be readily attained in a coupling assembly comprising a first member of generally cylindrical configuration with a radially outwardly extending flange adjacent one end thereof having an axially offset portion to provide a single helical thread of substantially rectangular cross section. An internally threaded member engaged with the first member has a helical groove with substantially parallel sidewalls providing the cooperating internal thread seating the flange. The flange and groove are cooperatively dimensioned for close fitting threaded interengagement.

In a more specific embodiment, the first member is a tubular conduit and the threaded member is a nut which has a polygonal external configuration to provide a readily gripped surface to facilitate turning thereof. The assembly may also include a second tubular conduit which has an end portion seated in relatively close-fitting relationship within an end portion of the first tubular member, and a resilient annular gasket may also be provided in the internally threaded member to bear against the first and second tubular conduits to effect a seal therebetween. In such a case, the gasket most desirably has a tapered outer surface adjacent one end to facilitate its entry between the tubular conduits and the nut is provided with an inwardly extending radial lip adjacent one end of the bore therein, overlying the opposite end of the gasket. By such an arrangement tightening of the nut upon the flange causes the lip to bear upon the gasket, which tends to wedge the gasket between the tubes so as to enhance the frictional and sealed engagement therebetween.

BRIEF DESCRIPTION OF THE DRAWING

FIG. 1 is a perspective view of a coupling assembly embodying the present invention;

FIG. 2 is a fragmentary vertical section view to an enlarged scale of the coupling assembly illustrated in FIG. 1;

FIG. 3 is a fragmentary elevational view of the reversely bent tubular conduit employed in the assembly; and FIG. 4 is a vertical sectional view of the nut employed in the assembly.

DETAILED DESCRIPTION OF THE ILLUSTRATED EMBODIMENT

Turning now in detail to the appended drawing, FIGS. 1 and 2 illustrate a coupling assembly embodying the present invention and FIGS. 3 and 4 illustrate component parts thereof. The assembly includes a reversely bent or generally J-shaped tubular conduit of the type useful as traps for sinks and the like. The enlarged portion 12 adjacent one end thereof has a flange 14 extending radially outwardly at its end, and the flange 14 is provided with a radial slit or is split, with one portion 16 thereof adjacent the slit being axially displaced to provide a generally helical thread of substantially rectangular cross section; the other portion of the flange 14 adjacent the slit is essentially undistorted.

One end of a second tubular conduit 18 is seated within the enlarged portion 12 of the tubular conduit 10 and an annular gasket 20, which has a tapered surface 21 at one end, extends between the inner surface of the tubular conduit 10 and the outer surface of the second conduit 18. The bore of then the nut 22 is provided with a helical groove 24 having parallel sidewalls, or a "square thread", as is seen in FIGS. 2 and 4. A lip 26 projects radially inwardly of the bore from the outer end of the nut 22 and defines a circular opening through which the end of the tubular conduit 18 is inserted.

As will now be apparent, to couple the tubular conduit 18 to the bent tubular conduit 10, one end thereof is inserted into the enlarged portion 12 with the tapered gasket 20 seated about tubular conduit 18 and extending within the enlarged portion 12. The nut 22 is threaded onto the flange 14 of the conduit 10 by introducing the undistorted end thereof into the groove 24. Turning the nut 22 about the flange 14 causes the lip 26 to bear upon the outer surface of the gasket 20, which wedges the gasket 20 between the tubular conduits 10, 18. This effects a seal thereat and creates compressive forces in the gasket 20 to enhance the frictional engagement between the conduits. Due to the generally rectangular cross-sectional configuration of the flange 14 and parallel sidewalls of the groove 22, they mate closely and there are no angular surfaces on the nut 22 to produce a camming effect upon the flange 14; thus a secure assembly is provided.

As will be appreciated, the essential elements of the inventive assembly are a cylindrical member which has a radially outwardly extending helical flange providing a single thread, and an internally threaded member providing a helical groove of rectangular cross section. The flange may be present on a tube, a pipe, a housing or other body of virtually any design or configuration, and the groove may be present on a similar member or on a collar or nut, such as that which is illustrated.

Although the flange may be a separate element which is secured to the main portion of the member to be joined, the most significant advantages of the invention reside in the economy and simplicity with which a relatively thin gauge tube or the like can be adapted for engagement with threaded members simply by stamping or otherwise integrally forming the flange directly on the end of the tube. The flange may be formed with the necessary helical configuration in a single swaging and stamping operation, or it may be formed and subsequently severed to allow a portion of it to be displaced axially to produce the desired configuration. As suggested by the drawing, it is essential only that the displacement of one portion adjacent the radial slit therein be sufficient to permit the nut to be partially threaded upon the flange. Thereafter, the resiliency or deformability of the material of the flange will usually allow it to conform to the pitch of the groove in the threaded member simply as a result of the applied torque. It will be appreciated that the flange will inherently have a substantially rectangular cross section when it is produced as an integral element of a tube.

Tubes and like members suitable for use in accordance with the invention may be made of a metal such as brass, copper, stainless steel, etc., and they may be fabricated with or without seams; normally their gauge will be about 0.020—0. 0.042 inch, but they may be thicker or thinner if desired. Suitable members may also be produced of a synthetic plastic such as acrylonitrile-butadiene-styrene copolymer, polyvinyl chloride and polyethylene or of other resinous materials, and the method of producing the member and the threaded member will be dictated to some extent by the material employed. For example, as has been mentioned metal tubes may be swaged and stamped to produce the flange and/or the enlarged portion if present; plastic tubes or other plastic members, on the other hand, may be molded with all of the necessary elements.

Similarly, collars, nuts, and like elements employed as the second essential member which has the cooperating helical groove may be suitably fabricated of either a metallic or resinous material, and the technique for forming the groove therein will vary accordingly. A radially inwardly extending lip provided at one end of such a nut may serve a number of purposes; it may serve to wedge a gasket between the tubular members for sealing and frictional engagement as is illustrated, or it may provide an abutment surface for a rib or bead adjacent the end of a third member, by which interengagement is effected. Although the drawing illustrates an assembly wherein two tubular members are coupled by a nut, it should be appreciated that assemblies wherein only two principal members may be cooperatively threaded and joined directly are also within the scope of the invention. Thus, the internally threaded member may be a second tubular element which is provided with an internal helical groove of rectangular cross section for direct coupling with a first member providing the generally helical flange.

It should be noted that it is essential to the successful practice of this invention that the internal groove has a generally rectangular cross section providing parallel sidewalls, the so-called "square threads" known in the art being suitable. It has been found that the force necessary to pull a nut with a conventional V-shaped thread from the type of flange herein described is relatively low, whereas the square thread configuration results in a dramatic improvement. It is believed that the weakness of the joint produced with a conventional nut is due to the camming effect of the sloped edges of the V-shaped threads upon the flange. It is thought that this camming effect tends to distort the flange and facilitate its release.

Although a gasket of the type illustrated is preferred when a joint is to be formed with an unmodified tube or the like, its presence is not essential to the invention. Such a gasket may be relied upon only as a seal if desired, in which case it need not be especially designed for entry between adjacent members, and this is particularly true when the member to be joined is modified with a rib, bead, etc., to provide secure interengagement. Suitable gaskets may be fabricated of numerous materials including resilient natural and synthetic resins and rubbers, as well as nonresilient materials such as asbestos for high temperature applications.

Exemplary of the efficacy of the present invention is the following example wherein all dimensions are in inches unless otherwise indicated.

EXAMPLE

Members conforming substantially to the reversely bent and flanged tube illustrated in FIG. 3 and the nut illustrated in FIG. 4 of the drawing were produced and assembled for the purpose of illustrating the advantages of the present invention.

A seamless brass tube having an inside diameter of about 1-7/16 inches and a gauge of 0.031 inch was swaged and stamped to produce an enlarged portion on the end thereof having an inside diameter of about 1½ inches and a helical flange about ¼ inch wide projecting therefrom. The swaging and stamping was accomplished with one die using two punches. In the helical flange the separation between the ends was such as to provide a pitch equal to that which exists in a threaded member provided with 11½ threads per inch. For assembly with the modified tube, a die cast nut was produced with 11½ threads per inch, the grooves being rectangular in cross section and measuring about 0.05 inch in width and about 0.07 inch in height. The inside diameter of the nut was slightly less than 1¾ inches and the outside diameter thereof was about 2⅛ inches.

The nut was threaded upon the helical flange of the tube with a torque wrench, and a tightening force providing 50 foot pounds was gradually applied. At that point, although no further relative movement had occurred, the force was removed since the maximum torque that such an assembly is normally required to withstand about 35 foot pounds.

A similarly dimensioned nut having conventional V-shaped threads was also tightened upon a similarly dimensioned and configured tube. After a force of about 10 foot pounds had been applied the nut began to slip on the tube, and it was thereby determined that the maximum force that the assembly with the conventional nut could withstand was below 15 foot pounds.

Thus, it can be seen that the present invention provides a novel coupling assembly employing components which are relatively simple and economical to produce, but which nevertheless provide a secure sealed joint.

I claim:

1. A coupling assembly comprising a relatively thin walled tubular conduit of generally cylindrical configuration with a radially outwardly upset portion at one end thereof providing a flange extending rectilinearly from the plane of said one end of said conduit, said flange having a radial slit therein and being deformed to provide an axially offset portion serving as a single revolution, helical thread of substantially rectangular cross section, and an internally threaded nut on said tubular conduit having a helical groove of multiple revolutions with substantially parallel sidewalls providing said internal thread and seating said flange, said flange and groove being cooperatively dimensioned for close fitting threaded interengagement.

2. The assembly of claim 1 additionally including a second tubular conduit having an end portion seated in relatively close fitting relationship within an end portion of the tubular conduit providing said first mentioned conduit, said assembly also including a resilient annular gasket within said internally threaded nut and bearing against said tubular conduits to effect a seal therebetween.

3. The assembly of claim 2 wherein said gasket has a tapered outer surface adjacent one end to facilitate entry of at least a portion of it between said tubular conduits and wherein said nut has an inwardly extending radial lip adjacent one end of the bore therein overlying the opposite end of said gasket, so that tightening of said nut on said flange causes said lip to bear upon said gasket to wedge said gasket between said tubular conduits to enhance the frictional and sealing engagement therebetween.